United States Patent Office 3,647,732
Patented Mar. 7, 1972

3,647,732
COATING COMPOSITION
Bob G. Gower, Park Forest, and Richard F. Poss, Flossmoor, Ill., assignors to Sinclair Research, Inc., New York, N.Y.
No Drawing. Continuation of abandoned application Ser. No. 717,934, Apr. 1, 1968. This application Nov. 17, 1970, Ser. No. 90,425
Int. Cl. C08f 45/52
U.S. Cl. 260—28.5
11 Claims

ABSTRACT OF THE DISCLOSURE

A coating composition that contains up to about 90 weight percent of a polymeric film former, up to about 50 weight percent of a hydrocarbon wax, about 5 to 90 weight percent of a carboxyl group-containing leveling resin and about 0.2 to 40 weight percent of a leveling aid, gloss-improving lactam is disclosed. Additionally, about 0.05 to 0.4 weight percent of a carboxyl group-reactive, complexing metal is disclosed for the embodiment of detergent-resistant waxes.

---

This application is a continuation of my copending application Ser. No. 717,934, filed Apr. 1, 1968, now abandoned.

The present invention relates to improved coating compositions. More particularly, the invention relates to aqueous compositions, useful, for example, as floor polishes. In a broader aspect the invention relates to coating compositions containing as essential ingredients a carboxyl group-containing polymeric leveling resin and a lactam as a gloss improver or leveling aid. In a more specific aspect the invention concerns polish coatings wherein the detergent resistance of such coatings is achieved by the use of a combination of a carboxyl group-containing polymer as a film former, and a carboxyl group-reactive complexing metal, e.g., ammonium zirconyl carbonate, and also includes the use of, for example, a copolymer of styrene and maleic anhydride as a carboxyl group-containing leveling resin and a lactam as a leveling aid, or gloss improver. The lactam may also give the coating improved water resistance and recoatability.

Recent technological developments in the floor polish industry have established the concept of detergent-resistant, ammonia-removable polishes and detergent-resistant, acid-removable polishes. Products of these types exhibit a high degree of detergent resistance but, when desired, can easily be removed by adding household ammonia or vinegar to the floor washing solution. Improved floor maintenance can be achieved by mopping with detergent solution, which facilitates removal of soil and heel marks and thereby extends the service life of the polish. In contrast thereto, former polish compositions provided finishes which were more easily removed by detergent solutions and were more difficult to remove with stripper solutions. The present invention, by adding a lactam to these and other polishes, minimizes the gloss and leveling problems that have heretofore limited the use of styrene-maleic anhydride resins and other carboxyl group-containing polymers. The leveling resins of the present invention include the acid-soluble and alkali-soluble types. The polishes may be based on polymers for non-buffable systems, or on natural or synthetic waxes for buffable systems.

The composition of the present invention contains up to about 90, preferably about 40 to 80, weight percent of a relatively high molecular weight polymeric film former, about 0 to 50, preferably about 5 to 30, weight percent of a hydrocarbon wax, about 5 to 90, preferably about 5 to 35, weight percent of a carboxyl group-containing leveling resin, and about 0.2 to 40, preferably about 5 to 30, weight percent of a lactam. Additionally a minor amount, e.g. about 0.05 to 0.4, preferably about 0.1 to 0.2, weight percent of a carboxyl group-reactive, complexing metal may be added. These various percentages are based on the total non-aqueous components or solids in the emulsion.

In the embodiment of the invention wherein appreciable quantities of water-insoluble components (e.g. hydrocarbon wax) are utilized the composition can be an emulsion. In other embodiments, where all the components are essentially water-soluble, the composition will be a solution. By the terms aqueous coating composition, coating composition, etc, as used herein and in the claims are meant both the solution and emulsion forms of the invention.

THE POLYMERIC FILM FORMER

The polymeric film-forming component in the improved composition of the present invention can be the various emulsifiable, synthetic polymers employed in aqueous coating compositions. Such polymers include those obtained by addition polymerization of vinyl monomers, e.g., styrene, methyl styrene, divinylbenzene, and other vinyl aromatics, acrylic acids and esters, substituted acrylic acids and esters, vinyl halides, vinyl esters, etc. Examples of suitable film-formers include polystyrene, styrene-acrylic acid copolymers, ethylacrylate-acrylic acid copolymers, ethyl acrylate-methacrylic acid copolymers, styrene-methacrylic acid polymers, etc. For detergent resistant systems, the film-former will, like the leveling resin, preferably be a carboxyl group-containing polymer such as those composed of polymerized acrylic acid, methacrylic acid, itaconic acid, etc. Advantageously, about 1 to 10% of the monomer units in the film-forming polymer will be carboxyl group-containing monomer units and often about 2 to 7% will contain carboxyl groups. By the expression "carboxyl groups" as used herein and in the claims is meant unesterified, unaminated or uniminated carboxylic acid groups, including carboxylic acid groups which have been neutralized to their salt forms.

Often preferred film-forming polymers are those relatively high molecular weight polymers prepared by addition polymerization of olefinically-unsaturated monomers of 2 or 3 to about 12, preferably about 4 to 8, carbon atoms. And, as stated above, preferably one or more of the monomers will be carboxyl group-containing. Suitable polymers are also disclosed, for example, in U.S. Pat. Nos. 2,754,280 to Brown et al., 3,308,078 to Rogers et al. and 3,320,196 to Rogers, herein incorporated by reference.

The polymerization systems most often employed to produce the polymeric film-former used in the composition of the present invention are those systems wherein addition polymerization (including co- or interpolymerization) is effected in the presence of an emulsion polymerization catalyst, emulsifiers and water. These systems have the advantage of preparing an already emulsified polymeric film-former, which emulsion, after treatment, say, to remove or quench unexpired catalyst, may be used directly in formulating the coating composition. Ordinarily, the high molecular weight film-forming polymers have a molecular weight of about 10,000 to 500,000, preferably about 20,000 to 200,000, and are preferably in a finely-divided form, that is, characterized by a particle size in the emulsion of about 0.2 to 1 micron, most preferably about 0.4 to 0.6 micron.

THE LEVELING RESIN

While numerous polymers may be used as the leveling resin, the styrene-maleic anhydride copolymer which can provide the leveling resin component of the invention is preferred. The resin is relatively low in molecular weight, having about 1 to 5, preferably about 1 to 3, moles of styrene per mole of maleic anhydride and molecular weight of about 500 to 8,000, preferably about 1200 to 5000. The copolymer of styrene and maleic anhydride can be prepared by dissolving the styrene and maleic anhydride in a suitable solvent, employing as a polymerization catalyst a free-radical peroxide catalyst, preferably benzoyl peroxide or dicumyl peroxide, at a temperature of about 85 to 230° C. or more. Suitable solvents include the aromatic hydrocarbon solvents, which can be either the active aromatic solvents, that is, containing an active hydrogen atom, such as cumene, p-cymene, etc., or the non-active aromatics, such as xylene, toluene, etc. The active aromatic solvents are chain-terminating solvents and give lower molecular weight products. Other suitable solvents are the ketones, such as methylethyl-ketone, which are also active solvents. The preferred manner of carrying out the polymerization is by what is known in the art as incremental feed addition. By this method the monomers and catalysts are first dissolved in a portion of the solvent in which the polymerization is to be conducted and the resulting solution fed in increments into a reactor containing solvent heated to reaction temperature, usually the reflux temperature of the mixture. When an aromatic solvent is employed as the solvent for the polymerization the formation of the copolymers causes a heterogeneous system, the polymer layer being the heavier layer and recoverable by merely decanting the upper aromatic solvent layer and drying. On the other hand, when a ketone is the solvent, the formed copolymer is usually soluble in the solvent media so that recovery of the products necessitates a solvent-stripping operation.

The alkali-soluble leveling resins include the low molecular weight copolymers of styrene and maleic anhydride which have been partially esterified, e.g. about 50 to 100, preferably about 60 to 75, percent half-esterified with an aliphatic, including cycloaliphatic, monohydric alcohol of 1 to about 6, preferably 1 to about 3, carbon atoms. The esterified copolymers often have an acid number (determined as milligrams of KOH required to neutralize one gram of partially esterified copolymer) of about 175 to 325, preferably about 180 to 250. Preferred esterifying alcohols are monohydric alkanols such as n-propanol, n-butanol, etc.

Esters of the styrene-maleic anhydride copolymer, useful in the alkali-soluble form of the invention, can be prepared by reacting the monohydric alcohol with the copolymer under either bulk or solvent conditions. The reaction temperature may vary depending upon whether a solvent is used, the styrene to maleic anhydride ratio in the copolymer, the particular alcohol employed, etc. Generally, esterification reaction temperatures of about 320 to 400° F., often about 340 to 360° F., can be employed. Advantageously, an esterification catalyst such as lithium acetate can be employed.

An acid-soluble resin of the invention can be prepared by simply heating at elevated temperature a polyamine with the styrene-maleic anhydride copolymer. A temperature of about 125° C. is usually necessary to effect the reaction and temperatures beyond about 350° C. are generally not utilized in that they may cause undesirable side reactions or degradation of the product. The preferred reaction temperatures are about 190 to 280° C. The reaction may be carried in bulk or in the presence of a suitable mutual solvent for the reactants. The total reaction time may vary depending upon the particular reactants employed but will usually range from about 1 to 5 hours up to several days, if necessary.

The acid-soluble styrene-maleic anhydride copolymers of the invention include the relatively low molecular weight resins having about 1 to 5 moles of styrene per mole of maleic anhydride, preferably about 30 to 50 mole percent maleic anhydride, and up to about 9 styrene-maleic anhydride repeating units, often at least about 3 of such units. The preferred copolymers of the invention have a solution viscosity at 25° C. in a concentration of 10 grams of polymer dissolved in acetone to form 100 milliliters of solution (10%) of about 0.67 to .83 centistokes. The average molecular weight of the preferred styrene-maleic anhydride copolymers of the invention is generally in the range of about 500 to 3000, as determined by the Thermoelectric Differential Vapor Pressure Lowering Method on a Microlab Osmometer. The copolymers of the invention are often further characterized by melting points in the range of about 115 to 130° C. as measured by the Fisher-Johns Melting Point Apparatus described in the publication "Modern Laboratory Appliances," published by the Fisher Scientific Company in its publication No. 111, p. 575. To form the acid soluble polymer the copolymer can be reacted with a polyamine having a single primary nitrogen atom with the remaining nitrogen atoms being tertiary. These amines include those represented by the following structure:

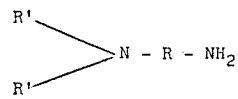

wherein R is a hydrocarbon radical of up to about 30 carbon atoms, preferably an alkylene radical of 1 to about 6 carbon atoms, or even more preferably 2 to 4 carbon atoms, and R' is a monovalent hydrocarbon radical, preferably alkyl, including cycloalkyl, of 1 to 30 carbon atoms, preferably up to 6 carbon atoms. Both R and R' can be substituted if desired and the two R' groups may be joined to give a ring structure, e.g. pyridyl. These polyamines include dialkylaminoalkyl amines such as dimethylaminomethyl amine, dimethylaminoethyl amine, dimethylaminopropyl amine, methylpropylaminoamyl amine, propylbutylaminoethyl amine and the like.

In addition to these particular leveling resins, it is to be understood that other leveling resins can be used as well. Thus, blends of the reacted styrene-maleic anhydride copolymer with, for example, rosin-maleic anhydride polyol leveling resin or rosin derivatives alone, addition polymers of acrylic acid with styrene, etc., can be used, see U.S. 3,308,078 for further examples.

THE HYROCARBON WAX

The waxes that may be employed in the compositions of the present invention are emulsifiable, essentially hydrocarbonaceous waxes. They may be either crystalline or amorphous in structure and may be of mineral, animal or vegetable origin, or, as is often preferred, may be synthetically derived. The particular waxes selected can depend on the physical properties desired in the applied composition. The waxes which are normally used include, for example, beeswax, ozokerite, microcrystalline wax, paraffin wax, carnauba wax, etc. Preferred waxes include emulsifiable, waxy, polymeric materials such as polyethylene wax or Fisher-Tropsch waxes. The preferred polyethylene waxes employed generally have a molecular weight of about 3000 to 15,000. Waxy copolymers of ethylene and addition polymerizable, polar group containing monomer, e.g., vinyl esters and acrylic acid esters, may also be used if desired. Advantageously, the hydrocarbon wax will also be a carboxyl group-containing wax. Carboxylated waxes are well known and are often derived by oxidation of the hydrocarbon wax, for example polyethylene wax, or, in the case of waxes obtained from addition polymerization of olefinic monomers, by inclusion of minor amounts of copolymerizable, olefinically-unsaturated carboxylic acids, such as acrylic acid, methacrylic acid, etc., in the polymerization mixture. Thus, it is often preferred that carboxyl group-containing hydrocarbon waxes having an acid number of at least about 5 be employed.

Examples of suitable synthetic waxes and methods of preparing same are those disclosed, for example, in U.S. Pat. No. 2,504,400 to Erchak et al. and U.S. Pats. Nos. 2,683,141 and 2,712,534 to Erchak herein incorporated by reference.

THE COMPLEXING METAL

The detergent-resistant polish compositions with which the present invention is concerned include those wherein the optional complexing agent which lends detergent resistance to the applied films is a carboxyl group-reactive, complexing metal selected from the group consisting of metals of Groups I–B, II–B, III–B, IV–B, V–B, VI–B and VIII of the Periodic Table having an atomic number of 21 to 78. Examples of such suitable metals include, for instance, zirconium, zinc, nickel, cadmium, copper, chromium and titanium. Most often employed as the complexing metal are zirconium and zinc.

Use of these complexing metals in carboxyl group-containing, aqueous coating compositions is well known in the art and is extensively discussed in prior patent literature. It is usually preferred to form a water-soluble complex of the particular metal to be used which complex will release the metal and make it available for transfer to the carboxyl groups, that is, for forming complex reaction products with available carboxyl groups in the polish formulation. An often preferred method of providing such a water-soluble form of the metal is to prepare a complex reaction product of a salt of the metal with ammonium carbonate and ammonium hydroxide. Preferably, the metal salt reacted with the ammonium carbonate and ammonium hydroxide is itself a water-soluble salt. Thus, in the case of zirconium, for example, suitable water-soluble salts for reacting with the ammonium carbonate and ammonium hydroxide include zirconium oxychloride octahydrate, zirconium tetrachloride, zirconium sulfate, zirconium nitrate, etc. With some of the metals, however, complex reaction products similar to, or the same as, those resulting from the reaction of the metal salt with ammonium carbonate and ammonium hydroxide are already commercially available. Ammonium zirconyl carbonate is one example of a suitable, commercially available source of zirconium for use as the carboxyl-reactive complexing metal in the polish compositions of the present invention.

Incorporation of the carboxyl-reactive complexing metal into the composition of the present invention can be, for example, by adding the metal, in water-soluble form, to an aqueous composition already containing the polymeric film-former, the carboxyl-containing leveling resin and the hydrocarbon wax, or, if desired, by first adding the metal to an aqueous solution of the styrene maleic anhydride leveling resin and then combining that resultant solution with an emulsion of the film-former and hydrocarbon wax. Generally, however, the order of addition of the components of the polish composition is not critical and may vary from either of the above techniques. It has been found, however, where a zirconium-ammonium-carbonate complex is used to supply the complexing metal that it is usually preferred to withhold addition of the complex until all of the other components of the composition are present. Contrastingly, in the case of a zinc-ammonium-carbonate complex it is often preferred to first form a mixture of the polymeric film-former, e.g., an acrylate polymer, and serially add: the zinc complex, the partially esterified styrene-maleic anhydride copolymer (preferably as an aqueous solution) and the hydrocarbon wax (also preferably as a wax emulsion). See U.S. Pats. 3,308,078 and 3,320,196 for further disclosure of the complexing metal.

THE LEVELING AID OR GLOSS IMPROVER

The coating compositions of the present invention contain a lactam which can serve as a leveling aid or gloss improver. Preferably, ε-caprolactam is employed to give superior leveling characteristics and was used in the specific examples described hereinafter. The lactam can further improve gloss, water resistance and recoatability, and is generally added in minor amounts, but sufficient to improve one or more of these characteristics. The leveling aid-gloss improver is generally a lactam of 4 to 6 carbon atoms in the ring. The lactam can be characterized by the formula:

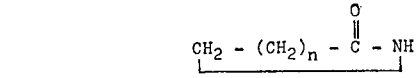

where $n$ is 2 to 4 and nondeleterious substituents, e.g. lower alkyl groups, may be substituted on the ring.

In the present invention, the lactam may be the final component added to the emulsion, or may be premixed with the leveling resin, when present, and the mixture added at the normal time of addition for the resin. Any other suitable time of addition may be used but the preferred time may depend on the components of the emulsion being prepared. The optional addition of other conventional leveling aids such as 2-pyrrolidone and tributoxyethyl phosphate can also be effected, for instance, after the copolymer has been added.

Caprolactam does not affect film hardness or black heel mark resistance when used at levels as high as 35%, based on the total non-aqueous material in the composition. Moreover the solubility of the different emulsions in acid or alkali solutions is not impaired in the metal complexed form of the invention, nor is the detergent resistance impaired.

Increased concentrations of other leveling aids does not afford the same properties as a lactam. For example, 1 part of additional 2-pyrrolidone per 100 parts of polish in the formulation of Example 1 gave a polish with very poor leveling properties and much spotting. The same amount of additional tributoxyethyl phosphate resulted in films that were soft to the touch after two hours drying. These films were equally hard after 24 hours but had greater heel marking characteristics with a Snell-type black heel marking capsule, when compared with similar polishes containing the same or lesser amounts of caprolactam.

In addition to the components discussed above, it is to be understood that various other ingredients commonly included in aqueous emulsion or solution compositions may additionally be present. There may be employed minor amounts of emulsion stabilizers such as fatty acids (saturated or unsaturated) of about 9 to 18 carbon atoms, e.g., oleic acid, ethylene oxide condensates with, for instance, nonyl phenol, e.g., in molar ratio of about 10 to 40:1, respectively, and glycols, e.g., ethylene glycol. Compositions of the present invention wherein zirconium is employed as the complexing metal are, for example, advantageously rendered emulsion stable by the inclusion of the fatty acid stabilizers, and zinc-containing emulsions, for example, are advantageously stabilized with ethylene oxide condensate-based non-ionic surfactants such as the ethylene oxide-nonyl phenol condensates.

The amount of water employed in the coating composition will be that sufficient to provide a stable solution or emulsion having a viscosity suitable for applying thin coatings therewith and is generally the major portion of the composition. Suitable compositions often have a water content of about 80 to 90 weight percent. It is also intended, however, that coating concentrates, requiring dilution prior to use, be embraced within the scope of the invention. In the emulsion form of the invention water is the continuous phase.

The invention will be better understood by reference to the following examples:

EXAMPLE I

The following polish composition was prepared:

| | Parts by vol. |
|---|---|
| (1) 15% solids acrylic emulsion [a] | 65 |
| (2) 15% ammonia salt solution of a leveling resin [b] | 25 |
| (3) 15% solids polyethylene wax emulsion [c] | 10 |
| (4) Tributoxyethyl phosphate | 1.0 |
| (5) 2-pyrrolidone | 0.5 |

[a] "Rhoplex B-231," a commecrial emulsion of methyl-methacrylate-ethylacrylate-methacrylic acid terpolymer.
[b] A 70% half ester of n-propyl alcohol of a copolymer of 2:1 styrene-maleic anhydride having a molecular weight of about 1900.
[c] "AC-680," commercial carboxylated polyethylene emulsified with 19 gm. oleic acid and 19 gm. morpholine per 100 gm. polyethylene.

Components 1, 2 and 3 were mixed and stirred for 15-20 minutes. Components 4 and 5 were then added and the composition stirred for 1 hour and allowed to stand overnight before evaluation. To determine leveling properties the polish was applied to a small black vinyl tile at a rate of 2000 ft.$^2$/gal. with a cotton swab. After the tile was covered a cross was drawn on the surface with a polish saturated swab. Polish was also applied to 72 in. long tiles under fluorescent lighting. Such lighting often shows streaking and spotting not otherwise observable. Leveling was rated as fair in both of the tests.

The leveling ratings used here are subjective but valuable for comparisons. Leveling was rated as fair, good or very good according to the following characteristics.

(1) Fair—Considerable streaking, spotting, puddling, drawing in or haziness. Any of these characteristics would result in leveling being rated as fair.
(2) Good—Very slight streaking, spotting, etc. Leveling would be rated as good if these problems were not readily visible under normal lighting but were apparent under fluorescent light.
(3) Very good—No streaking, spotting, etc. even under fluorescent light.

EXAMPLE II

The formulation of Example I was prepared, with the exception that 1 part by weight caprolactam was dissolved in the resin copolymer solution before addition to the mixture. Leveling, tested as in Example I, was rated as good in both tests.

EXAMPLE III

The composition of Example I was prepared and tested as before with the exception that the addition of enough 50% aqueous solution of caprolactam to give 1 part by weight caprolactam was made after all the other ingredients had been added. Leveling was rated as very good in both tests.

EXAMPLE IV

The following zirconium-complexed detergent resistant composition was prepared:

| | Parts by vol. |
|---|---|
| (1) 15% solids acrylic emulsion [d] | 65 |
| (2) 15% ammonia salt solution of leveling resin [b] | 25 |
| (3) 15% solids polyethylene wax emulsion [c] | 10 |
| (4) Tributoxyethyl phosphate | 1.2 |
| (5) 2-pyrrolidone | 0.5 |
| (6) Ethylene glycol | 1.5 |
| (7) Ammonium zirconyl carbonate | 2.8 |

[b] [c] See footnotes b and c under Example I.
[d] "Morton NH-401," a commercial acrylic polymer containing carboxylic groups incorporated by way of an unsaturated acid.

Components 1, 2 and 3 were mixed and stirred for 15 to 20 minutes. Components 4, 5 and 6 were next added and the mixture stirred for 30 minutes. Component 7 was finally added, the composition stirred for one hour, and allowed to stand overnight before testing. Detergent resistance was excellent and the polish easily removed with a detergent-ammonia solution. Leveling, as described in Example I, was rated as good.

EXAMPLE V

The composition of Example IV was prepared except that 1 part by weight caprolactam was dissolved in the leveling resin solution prior to its admixture. Detergent resistance and ammonia removability were unchanged but leveling was better, being rated as very good.

EXAMPLE VI

The composition of Example IV was prepared and tested as before with the exception that the addition of enough 50% aqueous solution of caprolactam to give 1 part by weight caprolactam was made after all of the other ingredients had been added. Detergent resistance and ammonia removability were unchanged from Example IV, but leveling was superior. Though not as good as Example V, it was still rated very good.

EXAMPLE VII

The following zinc complexed detergent resistant polish composition was prepared:

| | Parts by vol. |
|---|---|
| (1) 15% solids acrylic emulsion [a] | 65.0 |
| (2) Ethylene glycol | 1.5 |
| (3) "Tergitol NP-44" [e] | 1.0 |
| (4) Zinc solution [f] | 2.5 |
| (5) 15% solution of leveling resin [b] | 25.0 |
| (6) 15% solids polyethylene wax emulsion [c] | 10.0 |
| (7) Tributoxyethyl phosphate | 1.2 |
| (8) 2-pyrrolidone | 0.5 |

[a] [b] [c] See footnotes a, b, and c under Example I.
[e] A condenstaion product of nonyl phenol with ethylene oxide in a mole ratio of about 1:40 having a molecular weight of about 1980.
[f] Prepared by dissolving 54 gm. zinc oxide, 73 ml. of 28% aqueous ammonia, and 95 gm. of ammonium carbonate in 535 ml. of water.

Components 1, 2 and 3 were mixed and stirred for about 10 minutes, followed by the rest of the components in numerical order. After all the components were added, the mixture was stirred for one hour and allowed to stand overnight before testing. Detergent resistance and ammonia removability were good, but leveling, as determined in Example I, was only fair.

EXAMPLE VIII

The composition of Example VII was prepared except that 1 part by weight caprolactam was dissolved in the leveling resin solution prior to its admixture. Detergent resistance and ammonia removability were unchanged but leveling was better, being rated as good.

EXAMPLE IX

The composition of Example IX was prepared and tested as before with the exception that the addition of enough 50% aqueous solution of caprolactam to give 1 part by weight caprolactam was made after all of the other ingredients had been added. Detergent resistance and ammonia removability were unchanged from Example VII, but leveling was superior. Though not as good as Example VIII, it was still rated as good.

EXAMPLE X

The following optically clear, zinc complexed polish formulation was prepared:

| | Parts by vol. |
|---|---|
| (1) 17% solids acrylic emulsion [g] | 80 |
| (2) 17% ammonium salt solution of leveling resin [b] | 20 |
| (3) Carbitol | 2.3 |
| (4) 2-pyrrolidone | 1.2 |
| (5) Tributoxyethyl phosphate | 0.9 |
| (6) 1% solution of a fluorocarbon [h] | 0.5 |

[g] "Rhoplex E-505," a commercial emulsion derived from methyl methacrylate, ethyl acrylate and methacrylic acid incorporated metallic zinc.
[h] Fluorine-substituted hydrocarbon anionic surfactant.
[b] See footnote b under Example I.

The compounds were added in sequence as above, and the pH adjusted to 9.2 by dropwise addition of 28% aqueous ammonia upon completing the additions. The polish became optically clear after about one hour. Leveling, gloss, water resistance and recoatability were rated as fair.

EXAMPLE XI

The composition of Example X was prepared and tested as before with the exception that 4 parts by weight of caprolactam were added after all of the other components, and the composition diluted with water to the same non-volatile components concentration as Example X. The tack free drying time for the polish was slightly longer than that for the polish of Example X, but the viscosity was lower, and detergent resistance, storage stability, black heel mark resistance and wear resistance were comparable to Example X. Water resistance and recoatability were markedly improved and the polish rated very good as to leveling and gloss.

EXAMPLE XII

The composition of Example XI was prepared with the exception that the caprolactam was premixed with the leveling resin. The resulting polish had substantially the same characteristics as that of Example XI.

EXAMPLE XIII

The following optically clear polish formulation was prepared:

|   | Parts by vol. |
|---|---|
| (1) 17% solids acrylic emulsion [g] | 80 |
| (2) 17% aqueous ammonium salt solution of leveling resin [b] | 20 |
| (3) 2-pyrrolidone | 0.9 |
| (4) Tributoxyethyl phosphate | 0.9 |
| (5) Caprolactam (50% soln. in water) | 8.0 |
| (6) 1% solution of a fluorocarbon [h] | 0.5 |

[g] See footnote g under Example X.
[b] See footnote b under Example I.
[h] See footnote h under Example X.

The composition was prepared as in Example X. The resulting composition had a tack free drying time comparable to that of Example X, but had the other properties comparable to the improved characteristics of Examples XI and XII.

EXAMPLE XIV

The following optically clear, zinc complexed polish composition was prepared:

|   | Parts by vol. |
|---|---|
| (1) 80° C. water | 59.15 |
| (2) 28% aqueous ammonia solution | 1.9 |
| (3) Leveling resin [b] | 4.7 |
| (4) 38% solids acrylic emulsion [i] | 25.3 |
| (5) Tributoxyethyl phosphate | 1.8 |
| (6) Carbitol | 1.8 |
| (7) Diethylene glycol | 0.75 |
| (8) 1% solution of a fluorocarbon [h] | 0.5 |

[i] "Crilicon W-W100," structure similar to "Rhoplex E-503" [g], containing metallic zinc.
[b] See footnote b under Example I.
[h] See footnote h under Example X.

Components 1, 2 and 3 were mixed and stirred for 10 minutes, after which component 4 was added and the pH adjusted to 9.2. The remaining components were then added serially. Leveling, gloss, recoatability and water resistance were rated as fair.

EXAMPLE XV

The composition of Example XIV was prepared including 4 parts by weight caprolactam added with the leveling resin, and the composition was diluted to the same non-volatiles content as in Example XIV. While the tack free drying time was slightly increased, detergent and black heel mark resistance and storage stability were comparable to that of Example XIV. Water resistance and recoatability were greatly increased, and leveling and gloss were rated as very good.

EXAMPLE XVI

The following optically clear polish formulation was prepared:

|   | Parts by vol. |
|---|---|
| (1) 80° C. water | 66.6 |
| (2) 28% solution of ammonium hydroxide | 1.6 |
| (3) Leveling resin [b] | 3.8 |
| (4) Caprolactam (50% in water) | 8.0 |
| (5) 38% solids acrylic emulsion [i] | 21.5 |
| (6) Tributoxyethyl phosphate | 1.5 |
| (7) 1% solution of a fluorocarbon [h] | 0.5 |

[b] See footnote b under Example I.
[i] See footnote i under Example XIV.
[h] See footnote h under Example X.

The composition was prepared and had a tack free drying time as that of Example XIV. The other properties were comparable to those of Example XV.

EXAMPLE XVII

The following floor finish solution was prepared.

|   | Parts by vol. |
|---|---|
| (1) 15% ammonia salt soln. of leveling resin [j] | 100.0 |
| (2) Carbitol | 6.0 |
| (3) 2-pyrrolidone | 1.2 |
| (4) Tributoxyethyl phosphate | 1.0 |
| (5) Oleic acid | 1.0 |
| (6) 1% solution of a fluorocarbon [h] | 2.0 |

[h] See footnote h under Example X.
[j] An about 60 to 65% half-ester of cyclohexyl alcohol and a copolymer having 1:1 styrene-maleic anhydride mole ratio, and, having an esterified molecular weight of about 2200.

Components 1 and 2 were added and stirred for 10–15 minutes. Components 3, 4 and 5 were preblended and added with stirring continued for 30 minutes. Component 6 was then added and stirring continued for an additional 30 minutes. The polish then was allowed to stand overnight before evaluation. Leveling, as evaluated by the procedures in Example I was very good. Gloss, as determined by visual inspection, was very good.

EXAMPLE XVIII

The solution of Example XVII was prepared except that caprolactam (2.0 parts by weight) was dissolved in the leveling resin before addition of the other components. Leveling was very good, and gloss was excellent.

It is claimed:
1. An aqueous composition comprising water, about 0.2 to 40 weight percent of a lactam characterized by the formula

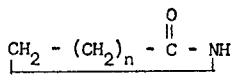

wherein $n$ is 2 to 4, about 5 to 90 weight percent of a carboxyl group containing leveling resin comprising a copolymer of styrene and maleic anhydride and having a relatively low molecular weight of about 500 to 8000, about 0 to 50 weight percent of a hydrocarbon wax and at least a film forming amount up to about 90 weight percent of a polymeric film former selected from the group consisting of polymers obtained by addition polymerization of vinyl monomers, acrylic acids, acrylic esters, substituted acrylic acids, substituted acrylic esters, vinyl halides and vinyl esters, said film former having a molecular weight of about 10,000 to 500,000, the percentages being based on the total non-aqueous components.

2. The composition of claim 1 wherein the lactam is caprolactam.

3. The composition of claim 1 in which there is included about 0.05 to 0.4 weight percent of a carboxyl group reactive complexing metal selected from the group consisting of zirconium, zinc, nickel, cadmium, copper, chronium and titanium.

4. The composition of claim 3 wherein the metal is selected from the group consisting of zinc and zirconium.

5. The composition of claim 1 wherein the leveling resin is a 50 to 100 percent partial ester of a copolymer of styrene and maleic anhydride, said copolymer being esterified with an aliphatic monohydric alcohol of about 1 to 6 carbon atoms, the molar ratio of styrene to maleic anhydride in said copolymer being about 1 to 5, and said copolymer having an unesterized molecular weight of about 1200 to 5,000.

6. The composition of claim 1 wherein the leveling resin is the reaction product of a copolymer of styrene and maleic anhydride having about 1 to 5 moles of styrene per mole of maleic anhydride and up to about 9 styrene maleic anhydride repeating groups, and a primary-tertiary polyamine having the structure:

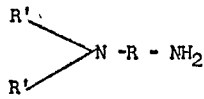

where R and R' are alkyl hydrocarbon radicals of up to about 30 carbon atoms, the ratio of said polyamine to said copolymer being at least about 1:1.

7. An aqueous composition comprising water, about 0.2 to 40 weight percent of a lactam characterized by the formula

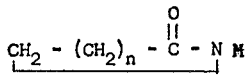

wherein $n$ is 2 to 4, about 5 to 90 weight percent of a styrene maleic anhydride copolymer leveling resin of relatively low molecular weight of about 500 to 8000, about 0 to 50 weight percent of a hydrocarbon wax and at least a film forming amount of a polymeric film former having a relatively high molecular weight of about 10,000 to 500,000, the percentages being based on the total non-aqueous components.

8. The composition of claim 7 comprising an aqueous emulsion having water as the continuous phase and about 5 to 30 weight percent of ε-caprolactam, about 5 to 35 weight percent of the styrene maleic anhydride copolymer leveling resin of relatively low molecular weight, about 5 to 30 weight percent of a hydrocarbon wax, and about 40 to 80 weight percent of a polymeric film former having a relatively high molecular weight of about 10,000 to 500,000.

9. The composition of claim 8 wherein the leveling resin is an about 50 to 100 percent half-esterified copolymer esterified with an aliphatic monohydric alcohol of about 1 to 3 carbon atoms, the molar ratio of styrene to maleic anhydride in said copolymer being about 1:1 to 3:1, and said copolymer having an unesterified molecular weight of about 1200 to 5000.

10. The composition of claim 8 wherein the leveling resin copolymer is the reaction product of a copolymer of styrene and maleic anhydride of about 30 to 50 mole percent maleic anhydride, having an average molecular weight of about 1500 to 2000 and a 10 weight percent solution viscosity at 25° C. of about 0.67 to about 0.83 centistoke, and a primary-tertiary polyamine having the structure:

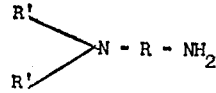

where R and R' are alkyl hydrocarbon radicals of up to about 6 carbon atoms, the ratio of said polyamine to said copolymer being at least about 1:1.

11. The composition of claim 7 in which there is included about 0.1 to 0.2 weight percent of a carboxyl group-reactive, complexing metal selected from the group consisting of zinc and zirconium.

References Cited

UNITED STATES PATENTS

| | | | |
|---|---|---|---|
| 1,170,571 | 5/1964 | Germany | 260—78.5 T |
| 3,388,186 | 6/1968 | Kray et al. | 260—78.5 T |
| 3,444,151 | 5/1969 | Verdol | 260—78.5 T |

FOREIGN PATENTS

| | | | |
|---|---|---|---|
| 2,965,594 | 12/1960 | Maeder | 260—28.5 |

THEODORE MORRIS, Primary Examiner

U.S. Cl. X.R.

260—78.5 T, 857, 901